United States Patent
Dewael et al.

(10) Patent No.: US 12,312,438 B2
(45) Date of Patent: May 27, 2025

(54) POLYMER COMPOSITION

(71) Applicant: SYENSQO SA, Brussels (BE)

(72) Inventors: Pascal Dewael, Buvrinnes (BE); Yves Vanderveken, Leuven (BE)

(73) Assignee: SYENSQO SA, Brussels (ES)

( * ) Notice: Subject to any disclaimer, the term of this patent is extended or adjusted under 35 U.S.C. 154(b) by 376 days.

(21) Appl. No.: 17/286,607

(22) PCT Filed: Nov. 7, 2019

(86) PCT No.: PCT/EP2019/080606
§ 371 (c)(1),
(2) Date: Apr. 19, 2021

(87) PCT Pub. No.: WO2020/099246
PCT Pub. Date: May 22, 2020

(65) Prior Publication Data
US 2021/0347936 A1 Nov. 11, 2021

Related U.S. Application Data

(60) Provisional application No. 62/759,960, filed on Nov. 12, 2018.

(30) Foreign Application Priority Data

Mar. 20, 2019 (EP) ..................................... 19163927

(51) Int. Cl.
| | |
|---|---|
| *C08G 63/183* | (2006.01) |
| *B32B 27/08* | (2006.01) |
| *B32B 27/36* | (2006.01) |
| *C08G 63/06* | (2006.01) |
| *C08G 63/66* | (2006.01) |

(52) U.S. Cl.
CPC ............ *C08G 63/183* (2013.01); *B32B 27/08* (2013.01); *B32B 27/36* (2013.01); *C08G 63/06* (2013.01); *C08G 63/66* (2013.01); *B32B 2250/02* (2013.01); *B32B 2250/24* (2013.01); *B32B 2307/7242* (2013.01); *B32B 2367/00* (2013.01); *B32B 2439/60* (2013.01); *B32B 2439/70* (2013.01); *C08G 2390/00* (2013.01)

(58) Field of Classification Search
CPC ...... C08G 63/183; C08G 63/06; C08G 63/66; C08G 2390/00; C08G 63/60; C08L 67/02; C08L 67/04; B32B 27/08; B32B 27/36; B32B 2250/02; B32B 2250/24; B32B 2307/7242; B32B 2367/00; B32B 2439/60; B32B 2439/70

USPC ....................................................... 528/308.6
See application file for complete search history.

(56) References Cited

U.S. PATENT DOCUMENTS

| | | | | |
|---|---|---|---|---|
| 4,156,676 A | * | 5/1979 | Bacskai | ................ C09J 167/04 524/600 |
| 5,914,381 A | * | 6/1999 | Terado | .................. C08G 63/60 525/54.31 |
| 2007/0111009 A1 | * | 5/2007 | Morris | .................. C09J 163/00 428/480 |
| 2009/0171039 A1 | * | 7/2009 | Sato | ......................... C08K 5/29 525/450 |
| 2011/0123744 A1 | | 5/2011 | Sato et al. | |
| 2013/0230725 A1 | * | 9/2013 | Shimada | ................ B32B 27/32 428/424.4 |

FOREIGN PATENT DOCUMENTS

| | | |
|---|---|---|
| JP | 2012011776 A | 1/2012 |
| WO | 2013099692 A1 | 7/2013 |
| WO | 2018115008 A1 | 6/2018 |
| WO | 2018115011 A1 | 6/2018 |

OTHER PUBLICATIONS

Baozhong Li et al "Poly( ethylene terephthalate co ethylene isophthalate)—relationship between physical properties and chemical structures", European Polymer Journal, 35 (1999), pp. 1607-1610. (Year: 1999).*
S. W. Lee et al "Poly(ethylene-co-ethyleneoxyethylene terephthalate)s: synthesis and non-isothermal crystallization behavior", Macromol. Chem. Phys. 201, 453-463 (2000) (Year: 2000).*
Tzong-Ming Wu et al Crystallization of Poly(ethylene terephthalate-co-isophthalate), Journal of Polymer Science: Part B: Polymer Physics, vol. 38, 2515-2524 (2000) (Year: 2000).*
R.Turner et al "Cyclohexanedimethanol Polyesters" Encyclopedia of Polymer Science and Technology, 2001 (Year: 2001).*

(Continued)

*Primary Examiner* — Ling Siu Cho
*Assistant Examiner* — Ronald Grinsted
(74) *Attorney, Agent, or Firm* — Osha Bergman Watanabe & Burton LLP

(57) ABSTRACT

A polymer composition [composition (M)], may include i) at least one polyglycolic acid polymer [polymer (PGA)], wherein polymer (PGA) is a branched polyglycolic acid polymer [polymer (b-PGA)] and ii) at least one amorphous polyester [polymer (APES)], the polymer (APES) being present in the composition (M) in an amount of at least 0.10 and of at most 45 wt %, with respect to the combined weight of polymer (PGA) and polymer (APES). A method of making composition (M) and method of producing a multilayer stretched product from composition (M) are also described.

19 Claims, No Drawings

(56) References Cited

OTHER PUBLICATIONS

S. Richard Turner "Development of Amorphous Copolyesters Based on 1,4-Cyclohexanedimethanol", Published online in Wiley InterScience. (Year: 2004).*
Technical Data Sheet Eastar™ copolyester 6763—retrieved on Dec. 9, 2023 (Year: 2023).*
Zekriardehani et al "Effect of Dimethyl Terephthalate and Dimethyl Isophthalate on the Free Volume and Barrier Properties of Poly(ethylene terephthalate)(PET): Amorphous PET", Macromolecules 2018, 51,456-467. (Year: 2018).*
Patkar et al "Effect of Diethylene Glycol (DEG) on the Crystallization Behavior of Poly (ethylene terephthalate) ( PET)", Journal of Applied Polymer Science, vol. 47, 1749-1763 (1993) (Year: 1993).*
Th. Rieckmann et al "Poly(Ethylene Terephthalate) Polymerization—Mechanism, Catalysis, Kinetics, Mass Transfer and Reactor Design", Modern Polyesters: Chemistry and Technology of Polyesters and Copolyesters, 2003. (Year: 2003).*

* cited by examiner

POLYMER COMPOSITION

This application is a U.S. national stage entry under 35 U.S.C. § 371 of International Application No. PCT/EP2019/080606 filed Nov. 7, 2019, which claims priorities to U.S. Provisional Application No. 62/759,960, filed Nov. 12, 2018 and to EP Application Serial No. 19163927.7, filed Mar. 20, 2019. The entire contents of these applications are explicitly incorporated herein by this reference.

The present invention pertains to a novel polymer composition, to a method of making the same, and to a method of producing a multilayer product using the same.

It is well known in the art to provide thermoplastic packaging articles such as bottles, films and sheets, and the like, which are useful for food and beverage packaging. Many such articles are made of multiple layers of different plastics in order to achieve the desired barrier properties.

It is commonly known in the art of food and beverage packaging to provide packaging articles mainly made of polyester such as a polyethylene terephthalate (PET). PET resin however suffers of insufficient gas barrier property whereas high gas barrier properties are needed to assure extended shelf life of the packaged goods. In order to overcome this insufficiency, multilayer products combining PET as a resin for forming each of an innermost layer and an outermost layer and using a polyglycolic acid (PGA) barrier layer have been considered.

What is however observed is that such structures PET/PGA/PET can present interlayer delamination which is highly undesirable, not only for aesthetics, but also for retaining the integrity of the structure and its mechanical properties, such as impact resistance and flex resistance.

In addition, the polymer composition which is used should remain compatible with post-recycling of the multilayer products. Therefore chemical adhesion between the layers should be avoided and reactive tie-layers cannot be used.

Now, the applicant has found a glycolic acid polymer composition, which is able to match the above-mentioned requirements and which can be hence successfully used in combination with standard polyesters resins, such as PET resins, for obtaining multilayer products such as bottles, films and sheets having a thin PGA barrier layer.

The invention hereby pertains to a polymer composition [composition (M)], said composition (M) comprising
  i) at least one polyglycolic acid polymer [polymer (PGA)] and
  ii) at least one amorphous polyester [polymer (APES)], said polymer (APES) being present in the composition (M) in an amount of at least 0.10 and of at most 45 wt %, with respect to the combined weight of polymer (PGA) and polymer (APES).

The polyglycolic acid polymer [polymer (PGA)] can be a branched polyglycolic acid polymer [polymer (b-PGA)], a linear polyglycolic acid polymer [polymer (l-PGA)] or a mixture [mixture (M)] of polymer (b-PGA) with polymer (l-PGA). The polymer (PGA) is preferably a polymer (b-PGA). Composition (M) therefore preferably comprises at least one polymer (b-PGA) and more preferably one polymer (b-PGA).

The polymer (PGA) presents a $T_m$, advantageously of at least 210° C., preferably of at least 220° C., more preferably of at least 230° C., preferably as measured by Differential Scanning calorimetry (DSC), according to ISO 11357-3 (European Standard) or ASTM D3418 (US Standard), during first heating from 20° C. to 270° C. at 10° C./minute under nitrogen on 10 mg of sample. The polymer (PGA) presents a $T_m$, advantageously of at most 250° C., preferably of at most 240° C., preferably as measured by DSC according to ISO 11357-3 (European Standard) or ASTM D3418 (US Standard), during first heating from 20° C. to 270° C. at 10° C./minute under nitrogen on 10 mg of sample. The polymer (PGA) presents most preferably a $T_m$ of 236° C. as measured by DSC according to ISO 11357-3 (European Standard) or ASTM D3418 (US Standard), during first heating from 20° C. to 270° C. at 10° C./minute under nitrogen on 10 mg of sample.

The polymer (PGA) presents a glass transition temperature ($T_g$), advantageously of at least 30° C., preferably of at least 35° C., more preferably of at least 40° C., preferably as measured by DSC according to ISO 11357-3 (European Standard) or ASTM D3418 (US Standard), during first heating from 20° C. to 270° C. at 10° C./minute under nitrogen on 10 mg of sample. The polymer (PGA) presents a glass transition temperature ($T_g$), advantageously of at most 60° C., preferably of at most 55° C. and more preferably of at most 50° C., preferably as measured by DSC according to ISO 11357-3 (European Standard) or ASTM D3418 (US Standard), during first heating from 20° C. to 270° C. at 10° C./minute under nitrogen on 10 mg of sample. The polymer (PGA) presents most preferably a $T_g$ of 45° C. as measured by DSC according to ISO 11357-3 (European Standard) or ASTM D3418 (US Standard), during first heating from 20° C. to 270° C. at 10° C./minute under nitrogen on 10 mg of sample.

The polymer (b-PGA) preferably comprises units derived from polycondensation of:
  (i) glycolic acid (GA);
  (ii) optionally, at least one hydroxyl acid having only one hydroxyl group and only one carboxylic acid group different from GA [hydroxyacid (A)], wherein the molar amount of hydroxyacid (A) is advantageously of at most 5% moles, with respect to the sum of moles of GA and hydroxyacid (A);
  (iii) at least one polyol comprising at least three hydroxyl groups and being free from carboxylic acid group [polyol (H)], wherein the amount of polyol (H) is such that the number of hydroxyl groups thereof is advantageously of at least 0.050% and advantageously of at most 0.750%, with respect to the overall number of hydroxyl groups of glycolic acid and of the hydroxyacid (A), if present; and
  (iv) optionally, at least one polyacid comprising at least two carboxylic acid groups and being free from hydroxyl groups [polyacid (0)], wherein the amount of polyacid (0) is such that the number of carboxyl groups thereof is advantageously of at least 0.050% and advantageously of at most 0.750%, with respect to the overall number of hydroxyl groups of glycolic acid and of the hydroxyacid (A), if present.

Complementary to units (i) to (iv) described above, the polymer (b-PGA) may optionally also comprise units derived from polycondensation of (v) at least one carboxylic acid having one carboxylic acid group and being free from hydroxyl group [monoacid (C)], wherein the amount of said acid (C) is such that the number of carboxylic acid groups thereof is advantageously of less than 0.010% with respect to the overall number of hydroxyl groups of glycolic acid and of the hydroxyacid (A), if present.

The choice of hydroxyacid (A) is not limited, and all hydroxyl acids capable of polycondensing, i.e. of forming a macromolecule by condensation (chain addition of monomers with removal of water) can be used. Examples thereof include lactic acid, 3-hydroxybutyric acid, 4-hydroxybutyric acid, 4-hydroxyvaleric acid, 5-hydroxyvaleric acid, 6-hydroxycaproic acid. In general, hydroxyacids (A) that have a primary alcohol are preferred as they are more reactive. With these regards, good results, in particular, can be obtained when the hydroxyacid (A) is lactic acid (LA) (L- or D-isomers, either in racemic mixture or as single isomer).

In one variant of the invention, both GA and the hydroxyacid (A), if present, are bio-sourced, that is to say derived from a natural and renewable raw material, as opposed to a fossil raw material. The use of bio-sourced PGA and, if applicable, hydroxyacids (A), allows the synthesis of "green" polymers, that is to say polymers synthesized from renewable raw material.

When present, the amount of hydroxyacid (A) is advantageously of at most 5% moles, preferably of at most 4% moles, more preferably of at most 3% moles; and/or said amount can be as low as 0.1% moles with respect to the sum of moles of GA and hydroxyacid (A). It is generally understood that the amount of hydroxyacid (A) will be tuned so as to possibly confer certain advantages while not too seriously detrimentally affect the barrier performances which are proper to the PGA.

Embodiment's where no additional hydroxyacid (A) is used, in combination with GA, are within the scope of the present invention, and may be preferred from the perspective of maximizing barrier performances.

The choice of polyol (H) is not particularly limited. Polyol (H) can be selected from the group consisting of:
triols, in particularly selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane,
trimethylolpropane ethoxylate, trimethylolpropane propoxylate, tris(hydroxymethyl)aminomethane;
tetraols, in particular selected from the group consisting of diglycerol, di(trimethylolpropane), pentaerythritol, 1,1,4-tris-(dihydroxyphenyl)-butane;
polyols comprising 5 hydroxyl groups, in particular triglycerol;
polyols comprising 6 hydroxyl groups, in particular dipentaerythritol; and
polyols comprising 8 hydroxyl groups, in particular tripentaerythritol.

Preferred polyols (H) are triols (in particular trimethylolpropane) and tetraols (in particular pentaerythritol), as above detailed, more particularly triols. A polyol (H) which has been found to provide particularly good results within the frame of the present invention is trimethylolpropane.

The polyol (H) is used in an amount such that the number of hydroxyl groups thereof is advantageously of at least 0.050%, preferably of at least 0.100%, more preferably of at least 0.200% and/or advantageously of at most 0.750%, preferably of at most 0.650%, more preferably of at most 0.600%, with respect to the overall number of hydroxyl groups of glycolic acid and of the hydroxyacid (A), if present.

An amount of polyol (H) such that the number of hydroxyl groups thereof is of from 0.300 to 0.550% with respect to the overall number of hydroxyl groups of glycolic acid and of the hydroxyacid (A), if present, has been found particularly useful according to the preferred embodiments of the present invention.

The polyacid (O) can comprise two carboxylic acid groups, three carboxylic acid groups or more than three carboxylic acid groups, e.g. four carboxylic acid groups. Polyacid (O) can be selected among polycarboxylic aliphatic acids, polycarboxylic cycloaliphatic acids and polycarboxylic aromatic acids.

Aliphatic dicarboxylic acid, cycloaliphatic dicarboxylic acids and aromatic dicarboxylic acid can be used as polyacids (O) having two carboxylic acid groups.

Specific aliphatic dicarboxylic acids include, for example, succinic acid, oxalic acid, malonic acid, glutaric acid, adipic acid, pimelic acid, suberic acid, azelaic acid, sebacic acid, undecanoic diacid and dodecanoic diacid, 3,3-dimethylpentane diacid.

Specific cycloaliphatic dicarboxylic acids include, for example, cyclohexanedicarboxylic acid such as hexahydroorthophthalic acid, hexahydrometaphthalic acid, hexahydroparaphthalic acid, and diacids having —COOH groups covalently bounded to a norbornylmethane backbone, a cyclohexylmethane backbone, a dicyclohexylmethane backbone, a dicyclohexylpropane backbone, a di(methylcyclohexyl) or di(methylcyclohexyl)propane backbone.

Aromatic dicarboxylic acids, that is to say aromatic diacids comprising two carboxylic acid groups which are covalently bound to an aromatic carbon atom which is part of the annular structure of the aromatic moiety, and being free from hydroxyl groups which can be used are notably phthalic acids, including isophthalic acid (IA), and terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid.

Examples of polycarboxylic aliphatic acids comprising three or more than three carboxylic acid groups are:
propane-1,2,3-tricarboxylic acid (also known as tricarballylic acid);
ethane-1,1,2,2 tetracarboxylic acid;
butane-1,2,3,4 tetracarboxylic acid;
pentane-1,2,4,5-tetracarboxylic acid.

Among them, propane-1,2,3-tricarboxylic acid and butane-1,2,3,4 tetracarboxylic acid are preferred.

Examples of polycarboxylic cyclo aliphatic acids comprising three or more than three carboxylic acid groups are:
1,2,3,4-cyclobutane tetracarboxylic acid;
2,2,6,6-tetra-(carboxyethyl)cyclohexanone;
(+)-(18-crown-6)-2,3,11,12-tetracarboxylic acid;
cyclopentane-1,2,3,4 tetracarboxylic acid;
cyclohexane-1,2,4,5 tetracarboxylic acid;
cyclohexane-2,3,5,6 tetracarboxylic acid;
3-ethylcyclohexane-1,2,4,5 tetracarboxylic acid;
1-methyl-3-ethyl cyclohexane-3-(1,2)5,6 tetracarboxylic acid;
1-ethyl cyclohexane-1-(1,2),3,4 tetracarboxylic acid;
1-propylcyclohexane-1-(2,3),3,4 tetracarboxylic acid;
1,3-dipropylcyclohexane-1-(2,3),3-(2,3) tetracarboxylic acid;

dicyclohexyl-3,4,3',4' tetracarboxylic acid.

Examples of polycarboxylic aromatic acids comprising three or more than three carboxylic acid groups are:
pyromellitic acid (1,2,4,5-benzene tetracarboxylic acid);
trimesic acid (1,3,5-benzene tricarboxylic acid);
trimellitic acid (1,3,4-benzene tricarboxylic acid);
benzophenone-3,3',4,4'-tetracarboxylic acid;
tetrahydrofuran-2,3,4,5-tetracarboxylic acid;
4,4'-(hexafluoroisopropylidene)diphthalic acid;
4,4'-oxydiphthalic acid anhydride;
4,4'-(4,4'-isopropylidenediphenoxy)bis(phthalic acid);
3,3',4,4'-biphenyl tetracarboxylic acid;
2,3,3',4'-biphenyl tetracarboxylic acid;
2,2',3,3'-biphenyl tetracarboxylic acid;
1,2,5,6-naphthalene tetracarboxylic acid;
2,3,6,7-naphthalene tetracarboxylic acid;
perylene-3,4,9,10 tetracarboxylic acid;
propane 2,2-bis(3,4-dicarboxyphenyl) acid;
ethane 1,1-bis(2,3-dicarboxyphenyl) acid;
ethane 1,1-bis(3,4-dicarboxyphenyl) acid;
phenanthrene-1,8,9,10-tetracarboxylic acid;
tetrahydrofuran-2,3,4,5-tetracarboxylic acid;
3,3',4,4'-benzophenone tetracarboxylique acid;
2,2',3,3'-benzophenone tetracarboxylic acid;
2,3,5,6-pyridine tetracarboxylic acid;
3,3',4,4'-tetraphenylsilane tetracarboxylic acid;
2,2'-bis-(3,4-bicarboxyphenyl) hexafluoropropane tetracarboxylic acid;
2,2-bis(3,4-dicarboxyphenyl) sulfonic acid;
4,4'-(hexafluoroisopropylidene) diphthalic acid;
3,3',4,4'-diphenylsulfone tetracarboxylic acid;
ethyleneglycol bistrimellitic acid;
hydroquinone diphthalique acid;
pyrazine-2,3,5,6-tetracarboxylic acid;
thiophene-2,3,4,5-tetracarboxylic acid.

Polyacids (O) which have been found to provide good results within the frame of the present invention are aromatic dicarboxylic acids. Phthalic acids are generally preferred. An aromatic dicarboxylic acid which has been shown to provide particularly good results is isophthalic acid, which is hence particularly preferred.

When present, the polyacid (O) is used in an amount such that the number of carboxyl groups thereof is advantageously of at least 0.050%, preferably of at least 0.075%, more preferably of at least 0.100% and/or advantageously of at most 0.750%, preferably of at most 0.650%, more preferably of at most 0.600% with respect to the overall number of hydroxyl groups of GA and hydroxyacid (A), if present.

An amount of polyacid (O) such that the number of carboxyl groups thereof is of from 0.100 to 0.550% with respect to the overall number of hydroxyl groups of GA and hydroxyacid (A), if present, has been found particularly useful according to the preferred embodiments of the present invention.

The choice of the monoacid (C) is not particularly limited. It is generally understood that better results are obtained with long chain acids, i.e. monoacids (C) wherein the total number of carbon atoms is advantageously at least 4, preferably at least 5 more preferably at least 6. Generally the monoacid (C) possesses from 4 to 36 carbon atoms, preferably from 6 to 24 carbon atoms.

The monoacid (C) may comprise unsaturated double bonds in its hydrocarbon chain; the monoacid (C) is nevertheless preferably an aliphatic acid, that is to say an acid of formula below:

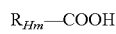—COOH         (formula C-1)

wherein $R_{Hm}$ is a monovalent aliphatic group having one or more than one carbon atom, in particular having 3 or more carbon atoms.

Among monoacids (C) of monoacid type which can be advantageously used in the process of the invention, mention can be notably made of caprylic acid [$CH_3(CH_2)_6COOH$], capric acid [$CH_3(CH_2)_8COOH$], undecanoic acid [$H_3C-(CH_2)_9-COOH$], dodecanoic or lauric acid [$H_3C-(CH_2)_{10}-COOH$], tridecanoic acid [$H_3C-(CH_2)_{11}-COOH$], tetradecanoic or myristic acid [$H_3C-(CH_2)_{12}-COOH$], pentadecanoic acid [$H_3C-(CH_2)_{13}-COOH$], hexadecanoic or palmitic acid [$H_3C-(CH_2)_{14}-COOH$], octadecanoic or stearic acid [$H_3C-(CH_2)_{16}-COOH$], arachidic acid [$H_3C-(CH_2)_{18}-COOH$], and behenic acid [$H_3C-(CH_2)_{20}-COOH$].

A monoacid (C) which has been show to provide particularly good results is stearic acid, which is hence particularly preferred.

When present, the amount of monoacid (C) is such that the number of carboxylic acid groups thereof is advantageously of less than 0.010% with respect to the overall number of hydroxyl groups of glycolic acid and hydroxyacid (A), if present. Preferably said amount is such that the number of carboxylic acid group of said monoacid (C) is advantageously of at least 0.0001, preferably of at least 0.0005%, more preferably of at least 0.001%, with respect to the overall number of hydroxyl groups of glycolic acid and hydroxyacid (A), if present; and/or advantageously of at most 0.010%, preferably of at most 0.008%, more preferably of at most 0.007%, most preferably of at most 0.006%, with respect to the overall number of hydroxyl groups of glycolic acid and hydroxyacid (A), if present.

The polymer (b-PGA) is generally manufactured by a method of polycondensation, which typically includes a first step of polymerization in the molten state to form a pre-polymer and a second step of solid state polymerization (SSP) for increasing molecular weight of the pre-polymer and delivering the target polymer (b-PGA).

The polymer (b-PGA) advantageously possesses a melt viscosity ranging from 100 to 2000 Pa×sec, when measured according to ASTM D4440-08 at a shear rate of 10 sec$^{-1}$ (at an oscillation rate of 10 rad/sec), at a temperature of 260° C. and with the use of parallel plates. Polymers (b-PGA) are those possessing a melt viscosity adavantageously of at most 2000 Pa×sec, preferably of at most 1500 Pa×sec, more preferably of at most 1200 Pa×sec and most preferably of at most 1000 Pa×sec. Polymers (b-PGA) are those possessing a melt viscosity adavantageously of at least 100 Pa×sec, preferably of at least 150 Pa×sec, more preferably of at least 200 Pa×sec and most preferably of at least 350 Pa×sec.

Polymers (b-PGA) which have been found to possess particularly advantageous properties are those having melt viscosities of ranging from 350 to 1000 Pa×sec, when measured according to ASTM D4440-08 at a shear rate of 10 sec$^{-1}$ (at an oscillation rate of 10 rad/sec), at a temperature of 260° C. and with the use of parallel plates.

The linear polyglycolic acid polymer [polymer (l-PGA)] advantageously essentially consists of recurring units derived from ring-opening-polymerization of glycolide. While end groups, defects or other impurities maybe present, it is understood that the polymer (l-PGA) is substantially free from units derived from a polyfunctional monomer possessing three or more than three functionalities able of polycondensing with hydroxyl and/or carboxyl groups of the GA.

Polymer (l-PGA) can be obtained by any method comprising heating glycolide (i.e. 1,4-dioxane-2,5-dione) to a sufficiently high temperature in the presence of an effective amount of catalyst (such as a cationic catalyst, e.g. a tin organic carboxylate, tin halide or antimony halide) to subject the glycolide to ring-opening polymerization. The said ring-opening polymerization is preferably conducted by a bulk polymerization process or solution polymerization process.

The polymer (l-PGA) generally possesses a melt viscosity ranging from 150 to 1000 Pa×sec, when measured according to ASTM D4440-08 at a shear rate of 10 sec$^{-1}$ (at an oscillation rate of 10 rad/sec), at a temperature of 260° C. and with the use of parallel plates. Preferred polymers (l-PGA) are those possessing a melt viscosity of at most 950 Pa×sec, more preferred are those possessing a melt viscosity of at most 900 Pa×sec. Preferred polymers (l-PGA) are those possessing a melt viscosity of at least 200 Pa×sec, more preferred are those possessing a melt viscosity of at least 250 Pa×sec.

Polymers (l-PGA) which have been found to possess particularly advantageous properties are those having melt viscosities of ranging from 300 to 850 Pa×sec, when measured according to ASTM D4440-08 at a shear rate of 10 sec$^{-1}$ (at an oscillation rate of 10 rad/sec), at a temperature of 260° C. and with the use of parallel plates.

A particularly preferred polymer (l-PGA) is a linear PGA commercially available under trade name KUREDUX® from Kureha produced by ring-opening polycondensation of glycolide, possessing a melt viscosity $\eta_{10\ sec-1}$ of 682 Pa×sec and a tan $\delta_{10\ sec-1}$ of 9, when measured at 260° C.

The mixture (M) of polymer (b-PGA) and polymer (l-PGA) comprises polymer (l-PGA) in an amount of advantageously at least 20 wt % and advantageously at most 40 wt %, with respect to the combined weight of polymer (b-PGA) and polymer (l-PGA).

The mixture (M) comprises an amount of polymer (l-PGA) of preferably at least 22 wt %, more preferably at least 23 wt % and most preferably at least 24 wt %, with respect to the combined weight of polymer (b-PGA) and polymer (l-PGA). The mixture (M) comprises an amount of polymer (l-PGA) of preferably at most 38 wt % and more preferably at most 37 wt %, with respect to the combined weight of polymer (b-PGA) and polymer (l-PGA).

The composition (M) comprises at least one amorphous polyester [polymer (APES)].

For the purpose of the present invention, the term "amorphous", when used in connection with the "polymer (APES)" is hereby intended to denote a polymer which, when taken alone, is substantially amorphous, that is to say, has a heat of fusion of less than 2.0 J/g, preferably of less than 1.5 J/g, more preferably of less than 1.0 J/g, as measured according to ASTM D3418 (US Standard) or ISO 11357-3 (European Standard). The heat of fusion is preferably measured by DSC according to ASTM D3418 (US Standard) or ISO 11357-3 (European Standard) during first heating from 20° C. to 270° C. at 10° C./minute under nitrogen on 10 mg of sample.

Advantageously, the polymer (APES) presents a glass transition temperature ($T_g$), advantageously of at least 25° C., preferably of at least 35° C., more preferably of at least 45° C. and most preferably of at least 50° C.; but does not present a melting temperature ($T_m$) during a first heating, preferably as determined by differential thermogravimetric analysis (DTGA) according to ISO 11358-1, more preferably during first heating from 25° C. to 400° C. at 10° C./minute under nitrogen 30 ml/min on 20 mg of sample, or by DSC according to ASTM D3418, more preferably during first heating from 20° C. to 270° C. at 10° C./minute under nitrogen on 10 mg of sample.

On the contrary thereto, crystalline polyesters [polymer (CPES)] advantageously present a melting temperature ($T_m$) during a first heating, preferably as determined by DTGA according to ISO 11358-1, more preferably during first heating from 25° C. to 400° C. at 10° C./minute under nitrogen 30 ml/min on 20 mg of sample, or by DSC according to ASTM D3418, more preferably during first heating from 20° C. to 270° C. at 10° C./minute under nitrogen on 10 mg of sample; complementary to a glass transition temperature ($T_g$) determined as defined above.

The amorphous polyester [polymer (APES)] is preferably selected from amorphous terephthalate-based copolyester [polymer (ATBPE)], amorphous polyethylene isophthalate [polymer (APEI)], amorphous polyethylene naphthalate [polymer (APEN)], amorphous polyethylene furanoate [polymer (APEF)] and amorphous polytrimethylene furandicarboxylate [polymer (APTF)]; more preferably is an amorphous terephthalate-based copolyester [polymer (ATBPE)].

Amorphous polymer (ATBPE) is advantageously selected from amorphous polyethylene terephthalate [polymer (APET)], amorphous polycyclohexylenedimethylene terephthalate [polymer (APCT)], amorphous polybutylene terephthlate [polymer (APBT)] and amorphous polytrimethylene terephthalate [polymer (APTT)]. Amorphous polymer (ATBPE) is preferably an amorphous polymer (APET).

Composition (M) comprises at least one amorphous polymer (APES) preferably selected from amorphous polymer (ATBPE), amorphous polymer (APEI), amorphous polymer (APEN), amorphous polyethylene furanoate [polymer (APEF)] and amorphous polytrimethylene furandicarboxylate [polymer (APTF)]. More preferably, the composition (M) comprises one such amorphous polymer (APES), most preferably one amorphous polymer (ATBPE) and particularly most preferably one amorphous polymer (APET).

Amorphous polymer (ATBPE) is advantageously obtained by copolymerization of terephthalic acid and a diol in the presence of at least one other comonomer, advantageously in replacement of part of the diol; or in the presence of isophthalic acid, advantageously in replacement of part of terephthalic acid.

Amorphous polymer (APET) is advantageously obtained by copolymerization of terephthalic acid and diethylene glycol or by copolymerization of terephthalic acid and ethylene glycol, optionally in the presence of at least one other comonomer, preferably in the presence of cyclohexane dimethanol, advantageously in replacement of part of diethylene glycol; or in the presence of isophthalic acid, advantageously in replacement of part of terephthalic acid.

Amorphous polymer (APES) is characterized by an inherent viscosity, preferably measured according to ASTM D4603, advantageously of at most 1, preferably of at most 0.85, more preferably of at most 0.80, most preferably of at most 0.78 and particularly most preferably of at most 0.76. Polymer (APES) is characterized by an inherent viscosity of advantageously at least 0.40, preferably at least 0.50, more preferably at least 0.52 and most preferably at least 0.54.

The composition (M) comprises polymer (PGA) and polymer (APES), said polymer (APES) being present in the composition (M) in an amount of at least 0.10 wt % and of at most 45 wt %, with respect to the combined weight of polymer (PGA) and polymer (APES).

When the content of polymer (APES) exceeds the claimed boundaries, the performances of composition (M) will be detrimentally affected, in that the resulting gas permeability will increase, with a significant loss of gas barrier. On the other side, when the content of polymer (APES) is below the claimed boundaries, its presence is ineffective for delivering a reduced crystallization tendency necessary to improve adhesion.

The composition (M) comprises an amount of polymer (APES) of at least 0.10 wt %, preferably of at least 0.25 wt %, more preferably of at least 0.50 wt %, most preferably of at least 1 wt %, with respect to the combined weight of polymer (PGA) and polymer (APES). The composition (M) comprises an amount of polymer (APES) of at most 45 wt %, preferably of at most 30 wt %, more preferably of at most 25 wt %, most preferably of at most 20 wt % and particularly most preferably of at most 15 wt %, with respect to the combined weight of polymer (PGA) and polymer (APES).

Composition (M) comprising polymer (PGA) and polymer (APES), said polymer (APES) present in the composition (M) in an amount of at least 0.50 wt % and of at most 25 wt %, with respect to the combined weight of polymer (PGA) and polymer (APES), are particularly preferred.

Composition (M) comprising polymer (PGA) and polymer (APES), said polymer (APES) present in the composition (M) in an amount of at least 1 wt % and of at most 20 wt %, with respect to the combined weight of polymer (PGA) and polymer (APES), are more particularly preferred.

The composition (M) comprises at least one polymer (APES), preferably comprises (only) one polymer (APES).

The composition (M) may additionally comprise additional ingredients, which may be notably selected from inorganic fillers, anti-oxidants, thermal stabilizers, additives for hydrolysis protection, buffers, UV and light stabilizers, pigments, plasticizers, lubricants (such as synthetic or natural waxes), processing aids and nucleating agents.

Examples of inorganic fillers include powders, whiskers and fibers of alumina, silica, silica-alumina, zirconia, titanium oxide, iron oxide, boron oxide, calcium carbonate, calciumsulfate, magnesium carbonate, magnesium silicate, magnesium phosphate, magnesium sulfate, clay, kaolin, talc, mica, ferrite, carbon, silicon silicon nitride, molybdenum disulphide, glass, potassium titanate and the like.

Examples of plasticizers include phthalates such as di(methoxyethyl) phthalate, dioctyl phthalate, diethyl phthalate and benzylbutyl phthalate; benzoates such as diethylene glycol dibenzoate and ethylene glycol dibenzoate; aliphatic dibasic esters such as dioctyl adipate and dioctyl sebacate; aliphatic tribasic acid esters such as tributyl acetylcitrate; phosphates such as dioctyl phosphate and tricresyl phosphate; epoxy plasticizers such as epoxidized soybean oil; and fatty acid esters of polyalkylene glycol, such as polyethylene glycol disebacate and polypropylene glycol dilaurate.

It is also possible to add to the composition (M) a copolymer based on styrene, acrylate, and/or methacrylate and comprising epoxy groups.

The invention further pertains to a method of making composition (M) as above detailed, said method including mixing polymer (PGA) and polymer (APES), and optionally additional ingredients.

According to a preferred embodiment, the method of making composition (M) includes a step of mixing in the molten state polymer (PGA) and polymer (APES), and optionally additional ingredients.

Mixing in the molten state can be achieved using standard melt compounding techniques, including using kneaders or extruders, preferably mono or twin screw, more preferably twin screw, extruders. In such embodiments, polymer (PGA) and polymer (APES) and optionally additional ingredients, can be pre-mixed all together and fed to the extruder through a single hopper, or can be fed to the extruder through separated feeders.

A masterbatch of polymer (PGA) and polymer (APES) and optionally additional ingredients, can also be prepared and diluted into polymer (PGA) in the extruder.

According to other embodiments, when polymer (PGA) is manufactured by a method of polycondensation including a first step of polymerization in the molten state to form a pre-polymer and a second step of solid state polymerization (SSP) for increasing molecular weight of the pre-polymer and delivering the target polymer (PGA), the polymer (APES) may be added via mixing in the molten state after first step is completed, so as to form a mixture of polymer (APES) and a branched polyglycolic acid pre-polymer, and pursuing the solid state polymerization so as to deliver composition (M).

The invention further pertains to a method for producing a multilayer stretched product, said method comprising:
 (i) forming a multilayer resin laminate including at least one layer of composition (M), as above detailed, and at least one layer of a thermoplast different from polyglycolic acid polymers, by processing from the melt;
 (ii) stretching the multilayer resin laminate, so as to produce the multilayer stretched product.

The choice of thermoplast is not particularly limited, provided that it can be laminated with a layer made of the composition (M).

Preferred examples of such thermoplast may include: polyester resins, such as PET, polyethylene furanoate and polyethylene naphthalate, polystyrene resins, acrylic acid or methacrylic acid resins, nylon resins, sulfide resins such as polyphenylene sulfide, and polycarbonate resins. Among these, it is preferred to use a polyester resin, particularly an aromatic polyester resin composed of a diol component and a dicarboxylic acid component, of which at least one, particularly the dicarboxylic acid component, is an aromatic one, in order to provide a multilayer product which satisfies transparency and gas-barrier property in combination depending on the use thereof. PET is particularly preferred.

The thermoplast can also be a mixture of the above-mentioned thermoplast, preferably of a polyester resin, particularly preferably of PET, with a polymer (APES) as above defined or with the composition (M) according to the present invention as above defined. In such case, the thermoplast comprises advantageously at least 0.1 wt %, preferably at least 0.2 wt % and more preferably at least 0.5 wt %, at the polymer (APES) or of the composition (M) according to the invention, with respect to the combined weight of the thermoplast and polymer (APES) or composition (M). In such case, the thermoplast comprises advantageously at most 45 wt %, preferably at most 10 wt % and more preferably at most 5 wt %, at the polymer (APES) or of the composition (M) according to the invention, with respect to the combined weight of the thermoplast and polymer (APES) or composition (M).

The multilayer resin laminate can be of any shape or form; it can be notably under the form of a tubular laminate, e.g. a parison, a flat laminate or a shaped container.

A preferred example of the multilayer resin laminate is a bottle pre-form, including a threaded end and a closed-ended cylindrically shaped body.

The step of forming the said resin laminate can be performed by whichever technique involving processing the composition (M) and the thermoplast, while these are in the molten state.

Suitable preferred techniques are co-extrusion molding, and co-injection molding.

According the co-extrusion molding techniques, molten flows of the composition (M) and of the thermoplast are generated in dedicated screw extruders, and fed to a multiple slot die for providing the multilayer resin laminate.

In injection molding technique, molten shots of composition (M) and of the thermoplast are injected in the same mold through a multi-shot nozzle.

In the step (ii), the multilayer resin laminate is stretched, generally at a temperature enabling plastic deformation of the composition (M), generally beyond melting point.

According to certain embodiment's, the multilayer resin laminate is cooled and solidified after step (i) before undergoing step (ii). In this case, step (ii) includes advantageously a step of re-heating the multilayer laminate to a temperature which is above the glass transition temperature of the polymer (PGA) and of the polymer (APES) of the composition (M), and above the glass transition temperature of the thermoplast, and the multilayer laminate is stretched while heated. Stretching can be achieved by blowing a pressurized gas, typically air; the stretching step may be performed within a mould forcing the multilayer stretched product to adhere to a well-determined geometry.

According to other embodiment's, the multilayer resin laminate is submitted to step (ii) without any intermediary cooling and re-heating step, hence advantageously maintaining composition (M) in the molten state during step (ii).

According to certain embodiment's of this variant, an extruded multilayer resin laminate e.g. under the form of a parison can be blown using compressed air, while in the molten phase, directly as extruded from the die.

According to certain embodiment's of this variant, an extruded multilayer resin laminate e.g. under the form of a film can be stretched, e.g. mono-axially or bi-axially stretched using suitable stretching means operating in the machine and/or in the traverse directions.

According to these embodiment's, the multilayer stretched product can be notably a multilayer blown film (stretched from the molten phase without any intermediate cooling/solidification step), a multilayer cast film (generally mono-axially stretched) or a multilayer shrink film manufactured by double bubble process or biaxial stretching (Tender or Linear Motor Simultaneous Stretching (LISIM)) process.

Should the disclosure of any patents, patent applications, and publications which are incorporated herein by reference conflict with the description of the present application to the extent that it may render a term unclear, the present description shall take precedence.

EXAMPLES

The invention will be now be described in more detail with reference to the following examples, whose purpose is merely illustrative and not intended to limit the scope of the invention.

Raw Materials b-PGA is a branched PGA manufactured according to the teachings of WO 2018/115008 (SOLVAY S.A.), obtained from a mixture of GA, trimethylol propane (0.14 mole for 100 moles of GA), isophthalic acid (0.21 mole for 100 moles of GA) in the presence of methanesulfonic acid (1.350 g/kg of GA). b-PGA is characterized by a melting temperature ($T_m$) and a glass transition temperature ($T_g$), both measured by DSC according to ISO 11357-3 (European Standard) or ASTM D3418 (US Standard), during first heating from 20° C. to 270° C. at 10° C./minute under nitrogen on 10 mg of sample, of 236° C. for $T_m$ and 45° C. for $T_g$. b-PGA is also characterized by a melt viscosity of 527 Pa×sec measured according to ASTM D4440-08 at a shear rate of 10 sec$^{-1}$ (at an oscillation rate of 10 rad/sec), at a temperature of 260° C. and with the use of parallel plate.

ATBPE is an amorphous terephthlate-based copolyester commercially available under trade name EASTOBOND™ Copolyester 19411 from Eastman which is characterized by a $T_g$ of 51° C. (measured according to ASTM D3418 during first heating from 20° C. to 270° C. at 10° C./minute under nitrogen on 10 mg of sample) and an inherent viscosity (measured according to ASTM D4603) of 0.74.

CPET is a crystalline polyethylene terephthlate commercially available under trade name EASTAPAK™ Polymer 9921 from Eastman which is characterized by a $T_g$ of 79° C., a $T_m$ of 236° C., a heat of fusion of 59 kJ/kg (all three being measured according to ASTM D3418 during first heating from 20° C. to 270° C. at 10° C./minute under nitrogen on 10 mg of sample), and an inherent viscosity (measured according to ASTM D4603), of 0.80.

PET is polyethylene terephthlate commercially available under trade name Ramapet R180 from Indorama venture.

General Description of Compounding Procedure

Compositions as described in the examples below were compounded using a twin screw extruder Clextral BC21 (21 mm diameter, length 43 D, 9 barrel zones, vacuum in zone 7, 2 weight feeders and one hopper under nitrogen flow, die with 2 rond holes, water bath and air dryer, pelletizer) operating with the temperature profile as defined in Table 1, and recovering the mixture thereof under the form of pellets.

TABLE 1

| Zone | Z1 | Z2 | Z3 | Z4 | Z5 | Z6 | Z7 | Z8 | Z9 | Z10 | Z11 |
|---|---|---|---|---|---|---|---|---|---|---|---|
| T (° C.) | 100 | 260 | 260 | 260 | 250 | 250 | 220 | 220 | 220 | 230 | 230 |

Determination of the Peak Temperature of Crystallization ($T_C$) and of the Heat of Fusion ($\Delta H$)

Peak temperature of crystallization ($T_c$) and heat of fusion ($\Delta H$) were measured by DSC at 10° K/min, according to ISO 11357-3 (European Standard) or ASTM D3418 (US Standard), during first heating from 20° C. to 270° C. at 10° C./minute under nitrogen on 10 mg of sample.

Determination of Hydrolysis Resistance 10 grams of pellets of each of the compositions as described in the examples below were put in 250 ml of demineralized water in a clogged glass bottle. After an ageing in oven at 38° C., measurement of the conductivity of water was performed each 24 hours and the amount of time required to have an increase of the conductivity of water (due to the release of glycolic acid) was taken as the hydrolysis resistance.

Production of Films from Composition (M)

Films were prepared from the compositions as described in the examples below.

For this, a five-layer film A/B/C/B/A (A=PET, B=PET and C=composition comprising b-PGA as described in each example) was produced by coextrusion using three extruders connected to each other by a feed block (265° C.) and a flat die 300 mm wide (265° C.). A finishing calender was used to quench the film at 50° C., adjust the thickness and rewind the film.

The first extruder was a Brabender extruder (diameter 30 mm, length 25 D, 3 heating zones) and was fed with PET previously dried with dried air (dew point −3° C.) at 170° C. for 8 hours.

The second and third extruders were Brabender extruders (diameter 19 mm, length 25 D, 3 heating zones). The second was fed with PET previously dried as explained above and the third one was fed with each of the compositions described in the examples previously dried (dew point −3° C.) at 130° C. for 16 hours.

The temperatures in each zone and the screw speed for each of the 3 extruders are detailed in Table 2.

TABLE 2

| Extruders | Temperature in Z1 (° C.) | Temperature in Z2 (° C.) | Temperature in Z3 (° C.) | Screw speed (rpm) |
|---|---|---|---|---|
| First | 250 | 260 | 265 | 40 |
| Second | 270 | 260 | 255 | 42 |
| Third | 240 | 250 | 260 | 38 |

The thickness of the films was 18+/−3 μm for layers A/B, 10+/−3 μm for layer C and 18+/−3 μm for layers B/A.

Measurement of Oxygen Permeation (Initial Intrinsic Value and Barrier Stability)

The measurement of oxygen permeation was made according to ASTM D3985.

The principle of the method consists in determining the amount of oxygen which passes through a film, prepared as explained above, of each of the compositions described in the examples below, per unit time and unit area, for a defined temperature and relative humidity.

For this, the film was placed in a cell so that it separates this cell into two. The first part was supplied with oxygen and the second flushed with nitrogen. The oxygen which passed through the film was transported by the nitrogen to the coulometric detector. The latter thus determined the amount of oxygen per unit time. Knowing the surface area of the cell, the amount of oxygen in $cm^3$ per day and per $m^2$ was determined and afterwards expressed for 10 μm of b-PGA layer (initial intrinsic value of oxygen permeation).

The machine used was an Oxtran 2/21 and 2/22 (Mocon) machine, conditioned at 38° C. and 90% relative humidity.

The films were placed in aluminium bags and stored at 23° C. and 50% relative humidity before being placed in the various measurement cells of the machine.

The barrier stability was the time necessary to reach 2 times the initial intrinsic value of oxygen permeation.

Delamination Resistance

The measurement of delamination resistance was made according to T-peel Test ASTM D1876 on the films (size of samples: 25×200 mm) prepared as described above. One end of the film samples was submitted to an immersion in a caustic soda solution at 65° C. to separate layers B from layer C, allowing to clamp the 2 parts of the film in tensile jaws.

The average adhesion strength (N/cm) was then measured according to tensile testing with Hounsfield tensile machine (tensile sensor 5 N-23° C.-254 mm/min).

Example 1 (According to the Invention)

A composition comprising 90 wt % of b-PGA and 10 wt % of ATBPE was prepared according to compounding procedure detailed above.

Comparative Example 2

A composition comprising 90 wt % of b-PGA and 10 wt % of CPET was prepared according to compounding procedure detailed above.

Comparative Example 3

A composition comprising 100 wt % of b-PGA was prepared according to compounding procedure detailed above.

The peak temperature of crystallization (TO and the heat of fusion (AH), measured for the different examples according to the method described above, are mentioned in Table 3 below.

The hydrolysis resistance measured for the different examples according to the method described above, is mentioned in Table 4 below.

The oxygen permeation (initial intrinsic value and barrier stability) measured for the different examples according to the method described above, is mentioned in Table 5 below.

The delamination resistance measured for the different examples according to the method described above, is mentioned in Table 6 below.

TABLE 3

| Examples | $T_C$ (° C.) | ΔH (J/g) |
|---|---|---|
| Example 1 | 156 | 61 |
| Comparative Example 2 | 163 | 67 |
| Comparative Example 3 | 166 | 74 |

TABLE 4

| Examples | Resistance to hydrolysis (hours) |
|---|---|
| Example 1 | 170 |
| Comparative Example 2 | 160 |
| Comparative Example 3 | 150 |

TABLE 5

| Examples | Initial intrinsic value of oxygen permeation ($cm^3/m^2$ day) for 10 μm of b-PGA layer | Barrier stability (hours) |
|---|---|---|
| Example 1 | 9 | 290 |
| Comparative Example 2 | 10 | 285 |
| Comparative Example 3 | 11 | 150 |

TABLE 6

| Examples | Average adhesion strength (N/cm) |
|---|---|
| Example 1 | 3.0 |
| Comparative Example 2 | 2.7 |
| Comparative Example 3 | 2.8 |

The above-mentioned results illustrate that the composition according to the invention is characterized by a lower $T_C$, a lower ΔH, a better resistance to hydrolysis and leads to film presenting a higher average adhesion strength, compared to the compositions according to the comparative examples.

Surprisingly, the film obtained with the composition according to the invention is characterized by a very good oxygen permeation and an extended barrier stability.

The invention claimed is:

1. A polymer composition [composition (M)], said composition (M) comprising:
   i) at least one polyglycolic acid polymer [polymer (PGA)], wherein polymer (PGA) is a branched polyglycolic acid polymer [polymer (b-PGA)]; and
   ii) at least one amorphous polyester [polymer (APES)], said polymer (APES) being present in the composition (M) in an amount of at least 0.10 wt percent and of at most 45 wt percent, with respect to the combined weight of polymer (PGA) and polymer (APES), wherein the polymer (APES) has a heat of fusion of less than 2.0 J/g as measured according to ASTM D3418.

2. The composition (M) according to claim 1, wherein polymer (b-PGA) comprises units derived from polycondensation of:
   (i) glycolic acid (GA);
   (ii) optionally, at least one hydroxyl acid having only one hydroxyl group and only one carboxylic acid group different from GA [hydroxyacid (A)], wherein the molar amount of hydroxyacid (A) is at most 5 percent moles, with respect to the sum of moles of GA and hydroxyacid (A);
   (iii) at least one polyol comprising at least three hydroxyl groups and being free from carboxylic acid group [polyol (H)], wherein the amount of polyol (H) is such that the number of hydroxyl groups thereof is at least 0.050 percent and at most 0.750 percent, with respect to the overall number of hydroxyl groups of glycolic acid and of the hydroxyacid (A), if present; and
   (iv) optionally, at least one polyacid comprising at least two carboxylic acid groups and being free from hydroxyl groups [polyacid (O)], wherein the amount of polyacid (O) is such that the number of carboxyl groups thereof is at least 0.050 percent and at most 0.750 percent, with respect to the overall number of hydroxyl groups of glycolic acid and of the hydroxyacid (A), if present.

3. The composition (M) according to claim 1, wherein the polymer (APES) is selected from amorphous terephthalate-based copolyester [polymer (ATBPE)], amorphous polyethylene isophthalate [polymer (APEI)], amorphous polyethylene naphthalate [polymer (APEN)], amorphous polyethylene furanoate [polymer (APEF)] and amorphous polytrimethylene furandicarboxylate [polymer (APTF)].

4. The composition (M) according to claim 3, wherein the polymer (APES) is polymer (ATBPE).

5. The composition (M) according to claim 4, wherein polymer (ATBPE) is selected from amorphous polyethylene terephthalate [polymer (APET)], amorphous polycyclohexylenedimethylene terephthalate [polymer (APCT)], amorphous polybutylene terephthlate [polymer (APBT)] and amorphous polytrimethylene terephthalate [polymer (APTT)].

6. The composition (M) according to claim 1, wherein polymer (APES) is present in composition (M) in an amount of at least 0.50 wt percent and of at most 25 wt percent, with respect to the combined weight of polymer (PGA) and polymer (APES).

7. The composition (M) according to claim 1, wherein polymer (APES) is present in composition (M) in an amount of at least 1 wt percent and of at most 20 wt percent, with respect to the combined weight of polymer (PGA) and polymer (APES).

8. A method of making composition (M) according to claim 1, said method including mixing polymer (PGA) and polymer (APES), and optionally additional ingredients.

9. The method according to claim 8, said method including a step of mixing in the molten state polymer (PGA) and polymer (APES), and optionally additional ingredients.

10. A method of producing a multilayer stretched product, said method comprising:
    (i) forming a multilayer resin laminate including at least one layer of composition (M) according to claim 1, and at least one layer of a thermoplast different from polyglycolic acid polymers, by processing from the melt;
    (ii) stretching the multilayer resin laminate, so as to produce the multilayer stretched product.

11. The method according to claim 10, wherein the thermoplast is selected from the group consisting of polyester resins, polystyrene resins, acrylic acid or methacrylic acid resins, nylon resins, sulfide resins, and polycarbonate resins.

12. The method according to claim 10, wherein the step of forming the said multilayer resin laminate is performed by co-extrusion molding or co-injection molding.

13. The method according to claim 10, wherein the multilayer resin laminate is cooled and solidified after step (i) before undergoing step (ii).

14. The method according to claim 10, wherein the multilayer resin laminate is submitted to step (ii) without any intermediary cooling and re-heating step.

15. The composition (M) according to claim 4, wherein the polymer (ATBPE) is amorphous polyethylene terephthalate (APET) obtained by copolymerization of terephthalic acid and diethylene glycol or by copolymerization of terephthalic acid and ethylene glycol.

16. The composition (M) according to claim 15, wherein the polymer (ATBPE) is amorphous polyethylene terephthalate (APET) obtained by copolymerization of terephthalic acid and ethylene glycol, in the presence of isophthalic acid, in replacement of part of terephthalic acid.

17. The composition (M) according to claim 15, wherein the polymer (ATBPE) is amorphous polyethylene terephthalate (APET) obtained by copolymerization of terephthalic acid and diethylene glycol, in the presence of cyclohexane dimethanol, in replacement of part of diethylene glycol.

18. The composition (M) according to claim 1, wherein the polymer (APES) has a heat of fusion of less than 1.5 J/g as measured according to ASTM D3418.

19. The composition (M) according to claim 1, wherein the polymer (APES) has a heat of fusion of less than 1.0 J/g as measured according to ASTM D3418.

* * * * *